D. LIPPY.
Grain-Thrasher and Separator.
No. 160,689. Patented March 9, 1875.
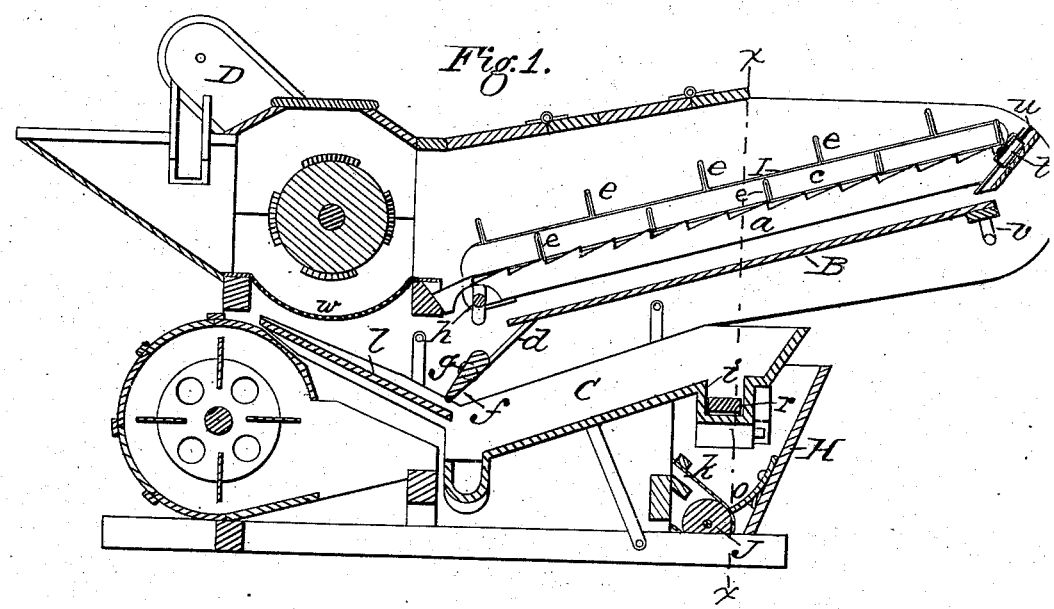

UNITED STATES PATENT OFFICE.

DAVID LIPPY, OF MANSFIELD, OHIO, ASSIGNOR TO JOHN S. BLYMYER, OF SAME PLACE.

IMPROVEMENT IN GRAIN THRASHERS AND SEPARATORS.

Specification forming part of Letters Patent No. 160,689, dated March 9, 1875; application filed July 30, 1874.

*To all whom it may concern:*

Be it known that I, DAVID LIPPY, of Mansfield, in the county of Richland and State of Ohio, have invented certain Improvements in Grain Thrashers and Separators, of which the following is a specification:

My invention consists in certain improvements in the construction of machines for thrashing and separating grain, whereby they are rendered more perfect in their operation, all as hereinafter more fully described.

Figure 1 is a longitudinal vertical section, and Fig. 2 is a transverse vertical section on the line $x \, x$ of Fig. 1. Figs. 3 and 4 are views of portions shown more in detail.

In constructing my improved machine I make the frame or body in the usual manner, the improvements having special reference to the devices for separating and cleaning the grain.

To separate the grain from the straw, I first provide a series of fixed bars, $a$, arranged lengthwise of the frame, and between them mount alternately a corresponding series of rake-bars, $c$, their front ends being connected to a double crank-shaft, $h$, in such a manner that as one bar falls the next one will rise, and their rear ends having cross-heads or grooved slides $t$ attached and arranged to slide on the edges of inclined plates $u$, these latter devices being shown more clearly in Fig. 4, and their relation to the bars being shown in Fig. 1. It will be observed that the rake-bars $c$ are so arranged in relation to the stationary bars $a$ as to rise considerably above the latter when in motion, and so that their teeth $e$ will always be higher than the stationary bars $c$, the object of which is to cause the rake bars to more thoroughly toss and shake up the straw, and thereby more effectually clear it of the shelled grain, the rake-bars with their teeth $e$ thus serving as beaters.

In constructing the teeth $e$ for the rake-bars, I take a thin bar or strip of metal, I, as shown in Fig. 3, and double or bend it up in such a manner as to form the vertical projections or teeth $e$, as shown. The bar I, when thus provided with the teeth $e$, is secured upon the upper edge of the rake-bar $c$, thus not only providing the bar with the teeth, but also covering its upper edge, and thus protecting it from wear. This is a very simple, cheap, and efficient method of constructing the teeth, and affords also a simple and efficient means of attaching them to the rake-bars.

Underneath the separating devices, I arrange an inclined bottom, B, the rear end of which is supported on a rock-shaft, $v$, while its front end is connected by a rod or pitman, $d$, to a shaft, $g$, on which there is an eccentric or crank by which motion is imparted to the bottom B, by which means this bottom board B is made to deliver its contents freely and regularly to the fan-shoe C for the action of the blast. As shown in Fig. 1, this shaft $g$ is located about midway between the lower ends of the two inclines or delivery-boards $l$ and B; and to prevent the clogging of the grain, chaff, straw, &c., at this point, I attach to the shaft $g$ a flat projecting strip or wing, $f$, which extends across from side to side, and which, being carried around with the shaft, operates effectually to keep the space clear and prevent the clogging of the material, thus insuring its more even and regular delivery to the shoe C, where it is operated upon by the sieves and the fan-blast. By these two means, I cause the grain, both at front and rear, to be delivered in a steady and continuous flow to the fan-shoe, whereby the blast is enabled to operate upon it more effectually and evenly, and consequently to clean it more thoroughly.

In the trough $i$ at the rear end of the shoe C, which receives the tailings or unthrashed heads, &c., in the usual manner from the screens, (not shown,) I place a board, $r$, which has a series of transverse notches or shoulders on its upper face, as shown in Fig. 2. This board is pivoted at its upper end as indicated at $p$, Fig. 2, while at its opposite end there is a pin, $n$, protruding from one of its edges, and engaging in an inclined groove in a bar, $m$, so that as the shoe C receives a lateral motion, this incline will impart to the lower end of the board $r$ an up-and-down motion, by which, in connection with the shoulders on its face, the material falling thereon is moved along and delivered into the hopper H at the side of the machine, from whence it is carried up by the conveyer D and delivered to the cylinder to be rethrashed, as is usual in these machines.

In order to prevent this material as it is delivered from the spout $i$ from falling down at the end of the conveyer-belt and becoming clogged behind the roller J, I place within the hopper H, as shown in Fig. 1, an elastic valve, $o$, which may consist of a strip of leather or rubber, it being made fast at its upper end, with its lower end resting loosely on the conveyer-belt $k$, as represented. It is obvious that this valve or apron $o$ may be made of rigid material, such as wood or sheet metal, its upper end being hinged or pivoted so as to permit its lower end to hang loose and rise to let the buckets or cleats on the belt $k$ pass freely under it, it being more or less inclined, so its free end will rest lightly on the belt $k$, and thus prevent the material from dropping down behind the pulley, where it is apt to become clogged and prevent the belt from operating as it should.

By these several improvements, I am enabled to make a machine that will operate effectually and economically.

Having thus described my invention, what I claim is—

1. The bars $c$, having secured to their upper edges the metal strips I, bent at intervals to form the teeth $e$, substantially as described.

2. The wing $f$, arranged to rotate in the space between the ends of the delivery-boards B and $l$, for the purpose of preventing the material from becoming clogged, substantially as described.

3. The notched board $r$, pivoted at its rear end in the spout $i$, attached to the shoe C, with its opposite end connected to and operated by the incline $m$, substantially as shown and described.

DAVID LIPPY.

Witnesses:
STEPHEN PRIEST,
L. B. MATRON.